(12) United States Patent
Peper et al.

(10) Patent No.: US 10,785,193 B2
(45) Date of Patent: Sep. 22, 2020

(54) SECURITY KEY HOPPING

(71) Applicant: Seagate Technology LLC, Cupertino, CA (US)

(72) Inventors: Michael E. Peper, Hygiene, CO (US); Ajaz M. Siraj, Lafayette, CO (US); Timothy J. Courtney, Longmont, CO (US)

(73) Assignee: SEAGATE TECHNOLOGY LLC, Fremont, CA (US)

( * ) Notice: Subject to any disclaimer, the term of this patent is extended or adjusted under 35 U.S.C. 154(b) by 357 days.

(21) Appl. No.: 15/474,578

(22) Filed: Mar. 30, 2017

(65) Prior Publication Data
US 2018/0287796 A1    Oct. 4, 2018

(51) Int. Cl.
| | |
|---|---|
| *G06F 21/00* | (2013.01) |
| *H04L 29/06* | (2006.01) |
| *H04L 9/32* | (2006.01) |
| *G06F 21/60* | (2013.01) |
| *H04L 9/06* | (2006.01) |
| *H04L 9/08* | (2006.01) |
| *G06F 21/62* | (2013.01) |
| *G06F 21/31* | (2013.01) |
| *G06F 7/58* | (2006.01) |

(52) U.S. Cl.
CPC .......... *H04L 63/0428* (2013.01); *G06F 21/31* (2013.01); *G06F 21/602* (2013.01); *G06F 21/606* (2013.01); *G06F 21/6209* (2013.01); *H04L 9/0662* (2013.01); *H04L 9/088* (2013.01); *H04L 9/0894* (2013.01); *H04L 9/3242* (2013.01); *G06F 7/588* (2013.01); *H04L 63/0478* (2013.01)

(58) Field of Classification Search
CPC ... H04L 63/0428; H04L 9/0662; H04L 9/088; H04L 9/0894; H04L 9/3242; H04L 63/0478; G06F 21/6209; G06F 21/31; G06F 21/606; G06F 21/602; G06F 7/588
See application file for complete search history.

(56) References Cited

U.S. PATENT DOCUMENTS

| | | | |
|---|---|---|---|
| 6,332,572 B1 | 12/2001 | Yamamoto et al. | |
| 7,936,870 B2 * | 5/2011 | Hauge | G06F 21/10 380/200 |
| 8,144,877 B2 | 3/2012 | Yang et al. | |
| 2003/0110376 A1 * | 6/2003 | Wiener | H04L 9/0891 713/158 |
| 2005/0232427 A1 * | 10/2005 | Konersmann | H04L 63/0428 380/277 |
| 2009/0154695 A1 | 6/2009 | Sanchez | |
| 2010/0153725 A1 | 6/2010 | Koo et al. | |
| 2011/0004758 A1 * | 1/2011 | Walker | H04L 12/06 713/168 |

(Continued)

*Primary Examiner* — Kendall Dolly
(74) *Attorney, Agent, or Firm* — Holzer Patel Drennan

(57) ABSTRACT

A network resource and a user device include secure connection applications that share one or more keys and a key selection criterion. A communication is received from the user utilizing a key selected from the one or more keys. The network resource selects a key based on the key selection criterion. If the keys match, then the user device is authorized and the user is allowed to access data of the network resource. The keys may further be selected and used to encrypt and decrypt data. Different key selections provide security to communications.

20 Claims, 7 Drawing Sheets

(56) References Cited

U.S. PATENT DOCUMENTS

| | | | |
|---|---|---|---|
| 2012/0063597 A1* | 3/2012 | Tropp | H04L 9/0861 380/259 |
| 2013/0007008 A1* | 1/2013 | Yuan | G06F 16/9014 707/747 |
| 2014/0052989 A1* | 2/2014 | Jones | G06F 21/85 713/171 |
| 2017/0244685 A1* | 8/2017 | Mirza | H04L 63/0428 |
| 2017/0250819 A1* | 8/2017 | Hoffstein | H04L 9/3026 |
| 2017/0338951 A1* | 11/2017 | Fu | H04L 9/0852 |

* cited by examiner

SECURITY KEY HOPPING

BACKGROUND

Cloud data security schemes can employ a variety of techniques to protect data. Such techniques may include data encryption and user authentication. Both encryption and authentication may employ the use of keys to provide increased security. For example, a key may be used to encrypt data, or a key may be used to authenticate a user requesting access to network resources. The key may be shared among multiple users or devices.

SUMMARY

Implementations and methods herein provide one or more keys to multiple users and or devices and a selection criterion for selecting a key of the one or more keys. The implementations and methods further provide that both parties to a communication may utilize selected key based on the criterion for secure communication. Moreover, next time a communication occurs, then the selected key may change based on the criterion.

These and various other features and advantages will be apparent from a reading of the following Detailed Description.

BRIEF DESCRIPTIONS OF THE DRAWINGS

DETAILED DESCRIPTION

In the following description, for the purposes of explanation, numerous specific details are set forth in order to provide a thorough understanding of the various implementations described herein. While various features are ascribed to particular implementations, it should be appreciated that the features described with respect to one implementation may be incorporated with other implementations as well. By the same token, however, no single feature or features of any described implementation should be considered essential, as other implementations may omit such features.

As more and more data is stored remotely (e.g., in the cloud) rather than locally (e.g., a user device), data security is increasingly important. Cloud security schemes can employ a variety of techniques to protect data, such as encryption, authorization, password systems, etc. Data encryption generally involves the transformation of input data into an encrypted output using a selected cryptographic or encryption algorithm, function or operation. The algorithm/function may utilize one or more keys to effect the transformation from input data (e.g., plain text) to output data (e.g., cypher text). If encrypted data is to be sent from a first user/device to a second user or device, then the second user or device must have knowledge of the one or more keys to decrypt the data such that it may be utilized.

In secure storage systems, data security schemes are enforced at the storage device level in a variety of ways. For example, a user may first require authentication before the user is allowed access to the secure storage systems. Multi-device storage systems may provide large scale storage capabilities in a distributed computing environment (e.g., cloud based object storage systems, RAID storage system, large database processing systems, etc.). Multi-device storage systems may utilize encrypted data at the storage device level and authentication passwords that can be used between the storage device and a host to identify and authenticate a data exchange.

Implementations described herein provide an enhanced security system utilizing key hopping. A set of keys, which may be used for authorization and/or encryption may be shared between two users or a user and a storage system. A key of the set of keys may be used in one secure communication or data encryption, wherein each party (e.g., a user and the storage system) knows which key to use based on a particular criterion. For example, such criterion may be the particular time of communication. In a successive communication, a different key may be used (e.g., selected), wherein each party knows which key to use. The keys are selected based on a selection criterion, which is known by both parties. These and other implementations are described further with respect to the following description and accompanying figures.

Figure 1:
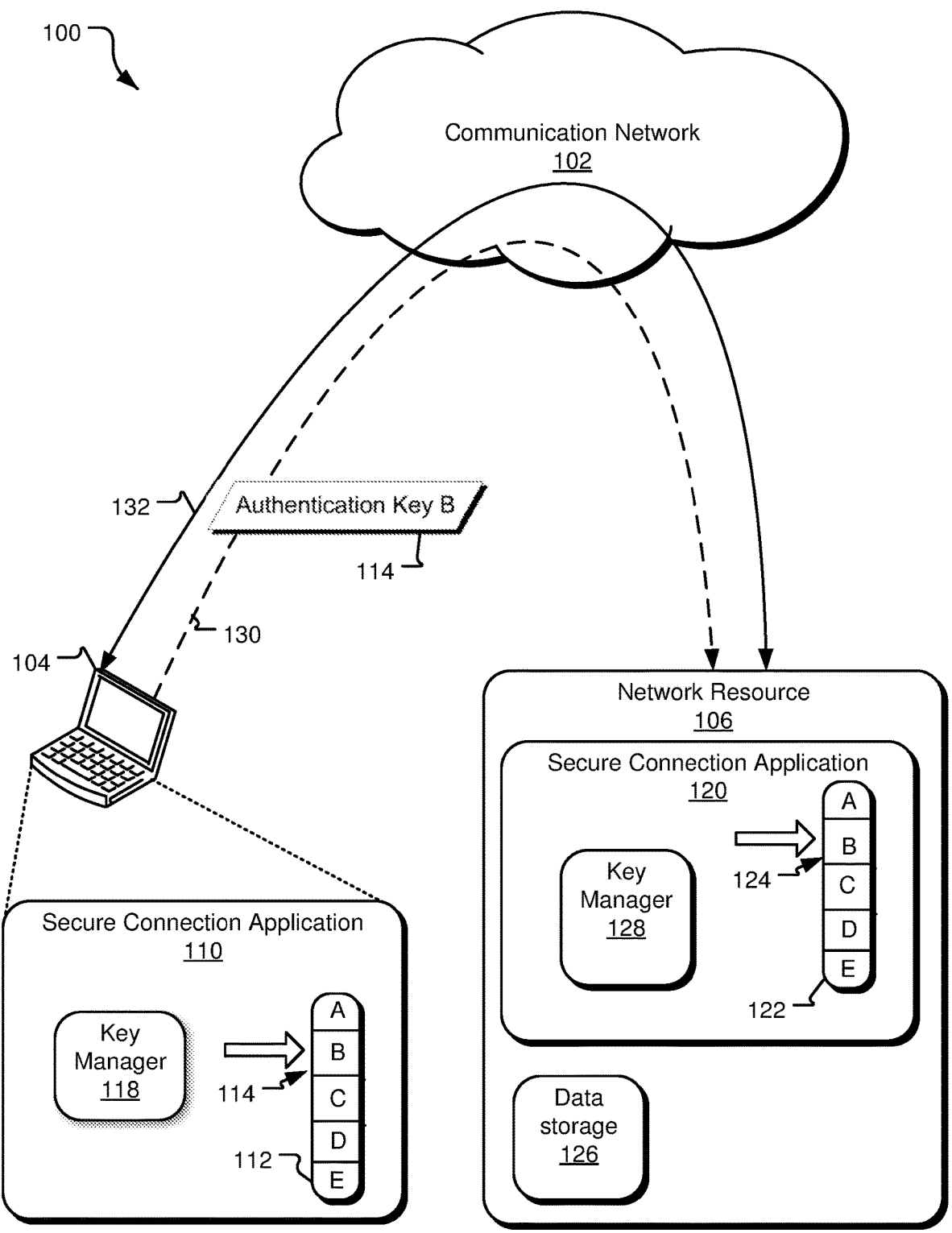
FIG. 1 illustrates an example implementation of security key hopping for authentication.

FIG. 1 illustrates an example implementation 100 of security key hopping for authentication. The implementation 100 includes a communication network 102, a user device 104, and a network resource 106. The user device 104 may be any type of device capable of communicating over a network. Such devices (e.g., the user device 104) may include desktop computers, laptop computers, personal digital assistants (PDAs), tablets, mobile phones, smart phones, etc. The communication network 102 may include a plurality of electronic devices that are communicatively connected and operable to facilitate communication between the user device 104 and the network resource 106. The network may include the Internet, intranets, local-area networks (LANs), wide-area networks (WAN) and other like computer networks.

The user device 104 may have a secure connection application 110 configured for the implementations described herein. The secure connection application 110 may have a key manager 118 used to select a security key from a plurality of keys 112. The secure connection application 110, including the key manager 118, may be embodied in instructions stored in a memory (not shown) of the user device 104 and executable on a processor (not shown) of the user device 104. Additionally, the plurality of keys 112 may be stored in the memory of the user device 104. The secure connection application 110, including the key manager 118 and the plurality of keys 112 may be secure on the user device 104. In implementations, the secure connection application 110 may be secure such that a user using the user device 104 requires authentication before accessing the secure connection application 110. This may provide another layer of security. Such authentication may include fingerprint recognition, password authentication, iris recognition, pin authentication, etc.

The network resource 106 may be a server, distributed system, remote database, etc. The network resource may include data storage 126, which holds network resources that may be accessible by a user (e.g., via the user device 104). The network source 106 further includes a secure connection application 120, which includes a key manager 128 configured to select a security key from a plurality of keys 122. The secure connection application 120, including the key manager 128, may be embodied in instructions stored in a memory of the network resource 106 and executable on a processor of the network resource 106. Additionally, the plurality of keys 122 may be stored in the memory of the network resource 106. The plurality of keys 112 and 122 may be the same plurality of keys (e.g., key s, "A," "B," "C," etc.) that are known by both the user device 104 and the network resource 106. It should be understood that keys "A," "B," "C," etc. are used for illustrative purposes, and keys used in actual implementations may be numerical keys with a large number of bits.

When a user (e.g., via the user device 104) wants to request (e.g., a request illustrated by arrow 130) or utilize the network resource 106 (e.g., retrieve data from the data storage 126 or store data to the data storage 126), the user may first establish a secure connection (e.g., a secure connection illustrated by an arrow 132) with the network resource 106. As such, both the secure connection application 110 of the user device 104 and the secure connection application 120 of the network resource 106 have previously established knowledge of a key set (e.g., the plurality of keys 112 and 122). The secure connection applications 110 and 112 are also both aware of a key selection criterion, which is only known by the secure connection applications 110 and 120.

As the user device 104 first sends a request 130 over the communication network to establish the secure connection 132, the request 130 may include a selected key 114 (e.g., a key "B"), the selection being based on the pre-determined criterion. The network resource 106 may receive the request 130 including the selected key 114. The secure connection application 120 may compare the received selected key 114 with a selected key 124 of the secure connection application 120 selected based on the predetermined criterion. If the selected key 114 matches the key 124, then the request may be authorized and the secure connection 132 may be established. Once the secure connection is established, then the user is authenticated to access the network resources. If the selected key 114 does not match the selected key 124, then the request 130 for the secure connection 132 may be denied. It is recognized that in some implementations, other handshakes and protocols may be layered on top of the technology described herein.

In various implementations, the request for network resources may be encrypted using the selected key which outputs a message authentication code (MAC). The MAC and the request message may be sent as the request, and the network resource 106 may use its selected key based on the criterion and perform the MAC function (e.g., a cryptographic operation) on the message, which generates a second MAC. If the two MACs match, then the message content is authenticated and as such, so is the request for network resources. Other methods of verifying the integrity and authenticity of the request may be employed such as using hash message authentication code (HMACs). Furthermore, a variety of algorithms may be used to create the MAC functions such as block ciphers, and other cryptographic hash functions.

In implementations, the network resource 106 may be configured to serve a number of users (e.g., via a number of the user devices 104). As such, the network resource 106 may store information used to identify a user (e.g., a requester). For example, each secure connection application 110 of user devices (e.g., the user device 104) may include a unique application ID (e.g., a unique application license key) that may be used to identify the requesting device 104. In the same or different applications, the user may be identifiable by a device identifier (e.g., an identifier of the device 104). Thus, the request 130 may include the application ID (or the device identifier) such that the network resource may identify the user.

In aspects, the secure connection application 120 of the network resource 106 may have a set of keys (e.g., plurality of keys 122) for each user (e.g., the user 104), or the plurality of keys 112 and 122 may be sharable among different users. In this implementation, the selection criterion may be based on the user identifier. Accordingly, when the network resource receives a request with a user identifier (e.g., an application or device identifier), the secure connection application 120 may retrieve the selection criterion that is associated with the identified user. In this aspect, the secure connection application may compare the selected key 114 received with the request with the selected key 124 (based on the retrieved criterion) to establish a secure connection 132 or deny the request 130 for a secure connection.

In various implementations, the secure connection applications 110 and 120 may require initialization. Such initialization may be enabled by a system administrator of the network resource 106 or may be automatically enabled based on after a user signs up for secure resources, etc. Thus, when a user is authorized to use the system described herein, a set of keys (e.g., the plurality of keys 112) and a selection criterion may be securely shared with the secure connection application 110. If each user has a unique set of keys, then the secure connection application 120 may store the set of keys. Furthermore, the secure connection application 120 may store user identifying data (e.g., the device or application identifier) such that the user may be identified upon a request and the set of keys and/or the selection criterion may be retrieved. The initialization of the user to use the network resource 106 may be handled by a third party authenticator (not shown) to establish a third layer of security. The third party authenticator may, for example, generate the pluralities of keys 112 and 122 and the selection criterion for each user and securely send the information to the user device 104 and the network resource 106 such that the respective secure applications 110 and 120 may store the data. The third party authenticator may also generate and send the selection criterion to the user device 104 and the network resource 106 in the same manner. The plurality of keys 112 and 122 may be generated based on a unique user identifier such as the application identifier discussed above. In implementations, there may not be a "key set" per se but an initial shared key and then the next key is based on a predetermined operation on the initial key, then next key, etc.

The key selection criterion may be based on a number of parameters. For example, a selection criterion may be based on a date/time. In this aspect, a certain key of the plurality of keys 110 and 112 may be selected, in relation to the time of the request, based on the day of the week, the calendar date, time of day, etc. In this aspect, the key selected may also be based on the time of the last established secure connection or time since the last connection. For example, if three days have passed since the last secure connection was established, then the selected key may correspond to three. For example, the predetermined criterion may be based on time of communication such that a particular time within an hour determines the selected key. Thus, for example, if the request 130 was generated in the first fifth of a given hour, the first key A is selected, if the request 130 was generated in the second fifth of a given hour, the key B is selected, if the request 130 was generated in the third fifth of a given hour, the key C is selected, if the request 130 was generated in the fourth fifth of a given hour, the key D is selected, and if the request 130 was generated in the last fifth of a given hour, the key E is selected. In such an implementation, the system may account for slight differences in time bases, communication lags (collectively referred to as "time differences"), etc. For example, a particular key may be good for a particular portion (e.g., a fifth) of a given hour. However, the system would allow the key to be used, for example, one minute after the portion to account for time differences. Such accountancy for time differences may be called "fuzzy boundaries."

The key selection criterion may also or alternatively be based on a mathematical operation, the size of previously transferred data, a location of the user device 104, a session number (e.g., the number of communications between the user device and the network resource 106) etc. A mathematical operation may use parameters such as the number of seconds passed since the last secure connection was established.

Furthermore, the criterion may be based on the location of the requested data within the network resource 106. For example, the storage media may be virtually divided in to five contiguous locations on the storage media. If the requested data is in the first fifth of the storage media, then the key A may be selected; if the requested data is in the second fifth of the storage media, then the second key B may be selected, etc. Another example criterion may use a modulo operation. For example, if five keys are shared, then a variable such as the location of the requested data, current time, etc. may be included in a modulo operation to find the selected key. For example, if the variable is 13 (e.g., 13 is the session number) and the number of shared keys is 5, then 15 mod 5 is executed, which yield a number 3. The third key, C, may be selected based on this operation.

Another example criterion may use a hash function. For example, the location of the requested data, data selected from the request message, etc. may be hashed to a hash value, which may be used to select a key set. The value may be used in a modulo operation as described above to arrive at a key. These and other criterion may be combined to arrive at criterions.

Depending on the selection criterion, the secure connection applications 110 and 120 must store certain information such as the time of the last secure connection, size of the last data transferred during a secure connection, the session number, etc. Information may also be shared between devices such the key may be selected. For example, if the selection criterion is based on the location of the user device 104, then the user device 104 may share its location (e.g., with the request 130) such that the secure connection application 120 may select a key from the plurality of keys 122 corresponding to the shared location.

The implementations described herein may be used to authenticate a user/requester of secure resources such the user may be authorized, and the user may be authorized at that particular time. A future communication may use another key of the plurality of keys based on the selection criterion. Such rotation of keys may provide security to resources and communications between devices. These and other implementations are described further with respect to the following figures.

Figure 2:
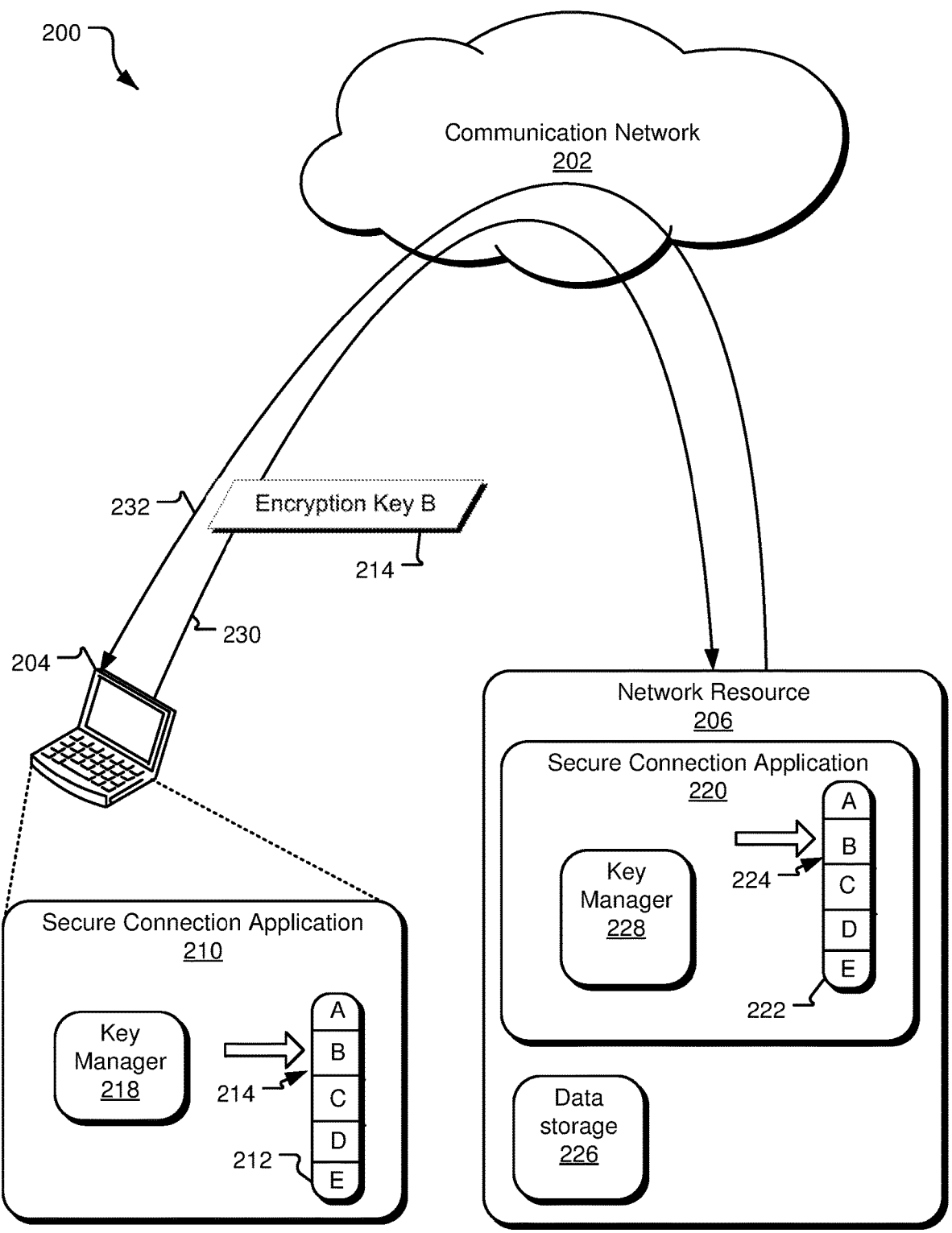
FIG. 2 illustrates another example implementation of security key hopping for encryption.

FIG. 2 illustrates another example implementation 200 of security key hopping for encryption. The implementation 200 includes a communication network 202, a user device 204, and a network resource 206. The user device 204 may be any type of device capable of communicating over a network. Such devices (e.g., the user device 204) may include desktop computers, laptop computers, personal digital assistants (PDAs), tablets, mobile phones, smart phones, etc. The communication network 202 may include a plurality of electronic devices that are communicatively connected and operable to facilitate communication between the user device 204 and the network resource 206. The network may include internets, intranets, local-area networks (LANs), wide-area networks (WAN) and other like computer networks.

The user device 204 may have a secure connection application 210 configured for the implementations described herein. The secure connection application 210 may have a key manager 218 used to select a security key from a plurality of keys 212. The secure connection application 210, including the key manager 218, may be embodied in instructions stored in a memory (not shown) of the user device 204 and executable on a processor (not shown) of the user device 204. Additionally, the plurality of keys 212 may be stored in the memory of the user device 204.

The network resource 206 may be a server, distributed system, remote database, etc. The network resource may include data storage 226, which holds network resources that may be requestable by a user (e.g., via the user device 204). The network source further includes a secure connection application 220, which includes a key manager 228 configured to select a security key from a plurality of keys 222. The secure connection application 220, including the key manager 228, may be embodied in instructions stored in a memory (not shown) of the network resource 206 and executable on a processor (not shown) of the network resource 206. Additionally, the plurality of keys 222 may be stored in the memory of the network resource 206.

In this illustrated implementation, data may be encrypted using a key selected from the plurality of key 212 and 222. For example, if a user using the device 204 wishes to send data to the network resource 206, then the secure connection application 210 will select a key 214 from the plurality of keys 212 and encrypt the data using the selected key 214, the selection being based on a predetermined criterion (as discussed above with respect to FIG. 1). Thereafter, the encrypted data may be sent (e.g., illustrated by arrow 230) to the network resource 206. The network resource 206 may receive the encrypted data and decrypt the data using a selected key 224 from the plurality of keys, the selection being based on the same predetermined criterion. The data may then be stored to the data storage 226. Such decryption may be referred to as a cryptographic operation.

In a similar manner, data from the network resource 206 may be encrypted using the selected key 224 from the plurality of keys 222, the selection being based on a predetermined criterion. The encrypted data may then be sent (illustrated by arrow 232) to the user device 204. The secure connection application 210 may select the key 214 from the plurality of keys 212 based on the predetermined criterion and decrypt the data using the selected key 214.

The above described implementations may be used in succession in a communication session, for example. If a communication session is established between the user device 204 and the network resource 206, data traveling between the user device 204 and the network resource 206 (collectively "devices") may be encrypted using a selected key. A new key selection may be triggered multiple times during the communication session. For example, a selection may be triggered based on the amount of data traveling between the devices, such as a data threshold (e.g., a new key is selected for every GB of data passed). A new key selection may also be triggered based on the current time, or an amount of time that has passed relative to a threshold. This trigger condition may be shared between the devices prior to the communication session. It should be understood that a similar communication session and key rotation may be implemented between two user devices or two remote network devices. As described above with respect to FIG. 1, the systems may account for time differences by using "fuzzy" boundaries.

Any number of different encryption methods may be used such as advanced encryption standard (AES) 256, twofish, serpent, etc. As such, plurality of keys 212 and 222 may be generated based on these used encryption standard.

It should be understood that any of the above described features may be used together such that keys may be selected based on the criterion and used to establish secure connections, authenticate users, and encrypt/decrypt data. For example, an authentication key (as described in FIG. 1 may be encrypted by an encryption key (as described in FIG. 2). Thus, the network resource 206 could decrypt the encrypted message using the known encryption key and compare the decrypted message (e.g., an authentication key) to a stored authentication key to confirm authentication. Thus, some example implementations use both authentication keys and encryption keys.

Figure 3:
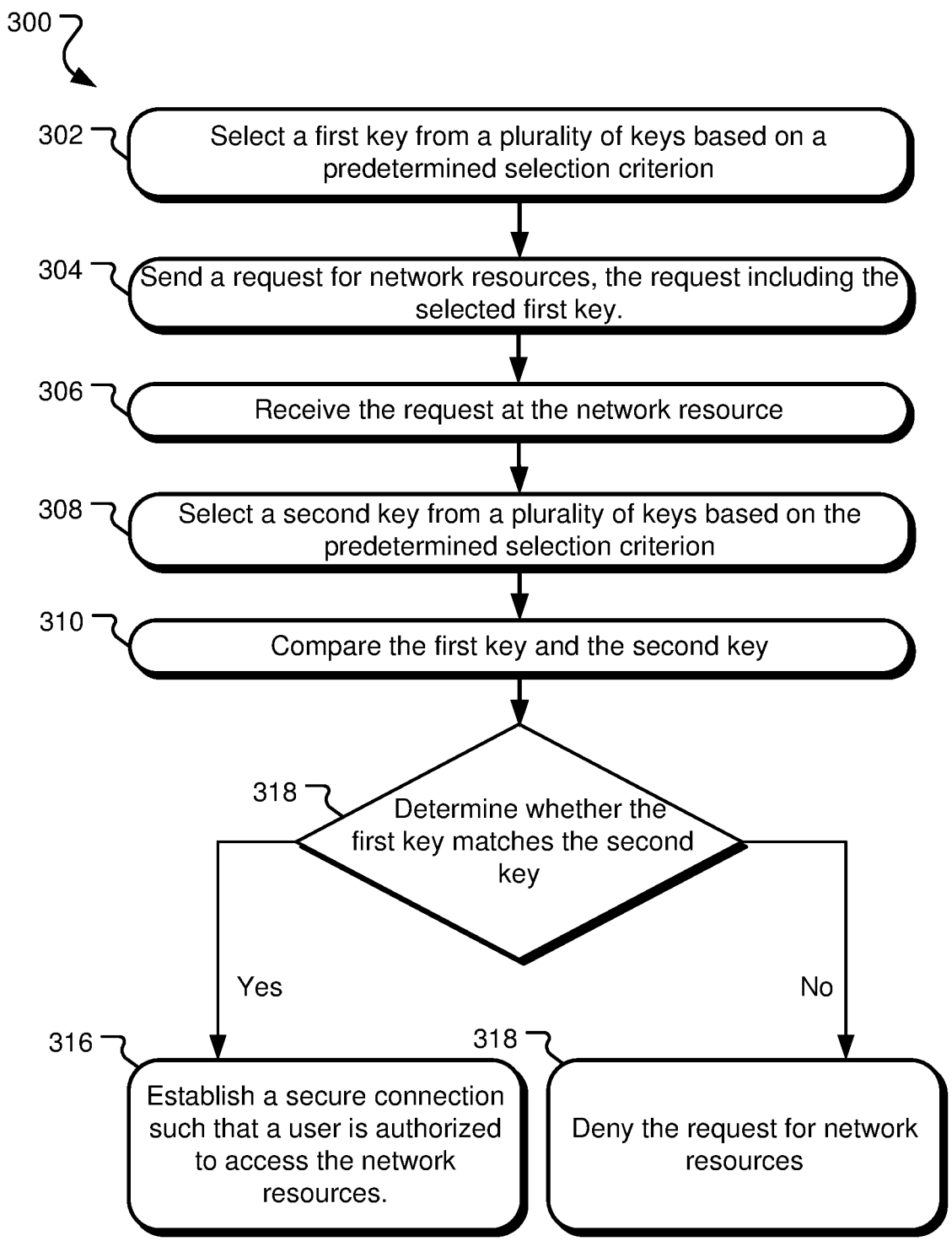
FIG. 3 illustrates example operations for security key hopping.

FIG. 3 illustrates example operations 300 for security key hopping. Processor readable instructions for the operations 300 may be stored in a memory and performed by a processor. The operations 300 may also be performed on different devices such as a user device and a network resource device. A selecting operation 302 selects a first key from a plurality of keys based on a predetermined selection criterion. A sending operation 304 sends a request for network resources, the request including the selected first key. The selecting operation 302 and the sending operation 304 may be executed by a secure connection application on a user device such as a mobile phone or laptop. The request may include a MAC value, the value being generated using a MAC function on a portion of the request message. A receiving operation 306 receives the request at the network resource. A second selecting operation 308 selects a second key from a plurality of keys based on the predetermined selection criterion.

A determining operation 318 determines whether the first key matches the second key. If the first and second keys match, then an establishing operation 316 establishes a secure connection such that a user is authorized to access the network resources. Alternatively, if the request includes a MAC, then the network resource may perform a MAC function (e.g., a cryptographic operation) on the portion of the message to generate another MAC. If the two MACs match, then the message is authenticated and the request may be authorized. If the first and second keys do not match (or the two MACs), then a denying operation 318 denies the request for network resources. As such, the user is not authorized to access the network resources. In a later request for a network resource, a criterion parameter may change (e.g., passage of time). As such, the selected key may change. Because the keys that are selected change, the network resources may be more secure.

Figure 4:
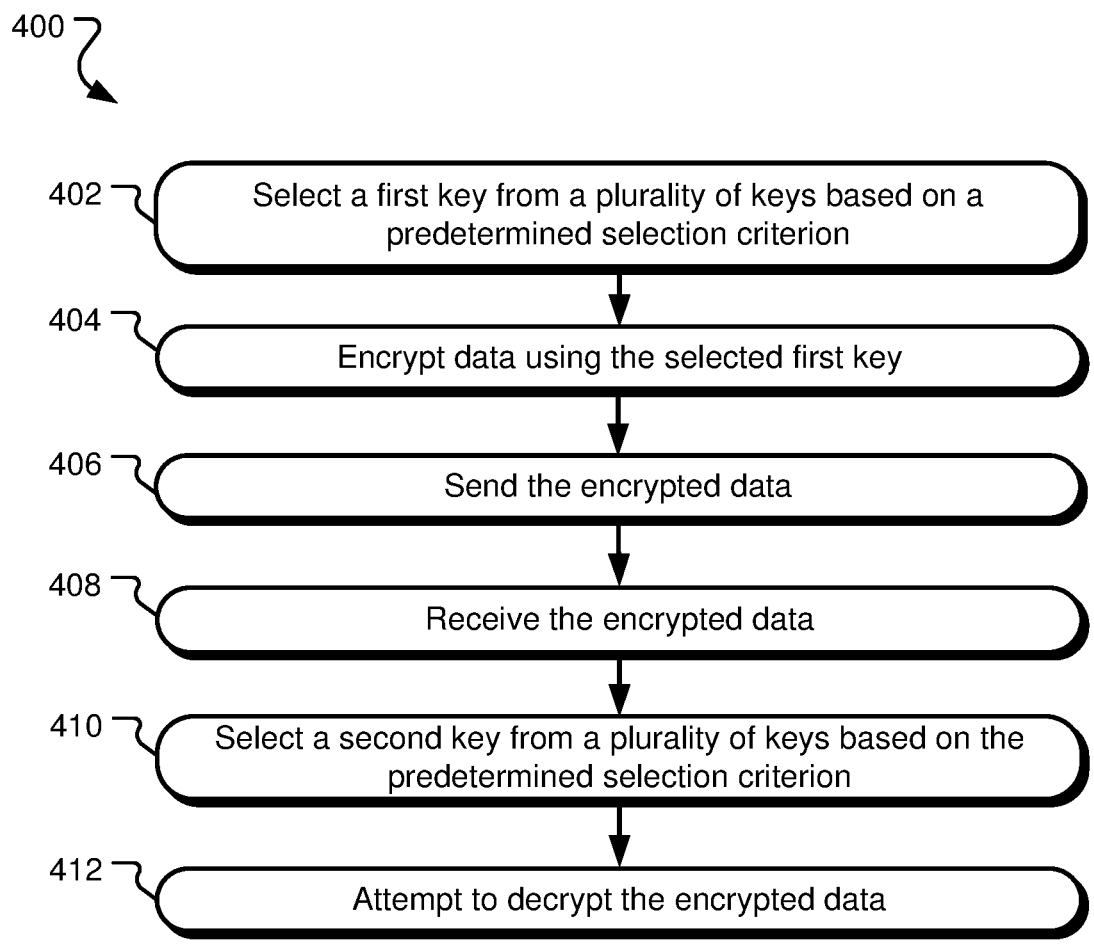
FIG. 4 illustrates alternative example operations for security key hopping.

FIG. 4 illustrates alternative example operations 400 for security key hopping. Processor readable instructions for the operations 400 may be stored in a memory and performed by a processor. The operations 400 may also be performed on different devices such as a user device and a network resource device. A selecting operation 402 selects a first key from a plurality of keys based on a predetermined selection criterion. An encrypting operation 404 encrypts data using the selected first key. A sending operation 406 sends the encrypted data. The encrypted data may be sent from a user device to another user device, from a user device to a network resource, from a network resource to a user device, etc.

A receiving operation 408 receives the encrypted data. A second selecting operation selects a second key from a plurality of keys. An attempting operation 418 attempts to decrypt (e.g., a cryptographic operation) the encrypted data. If the second key matches the first key, then the data may be encrypted, because the same key was used to encrypt. However, if the keys do not match, then the device/user may not have access to then encrypted data.

Figure 5:
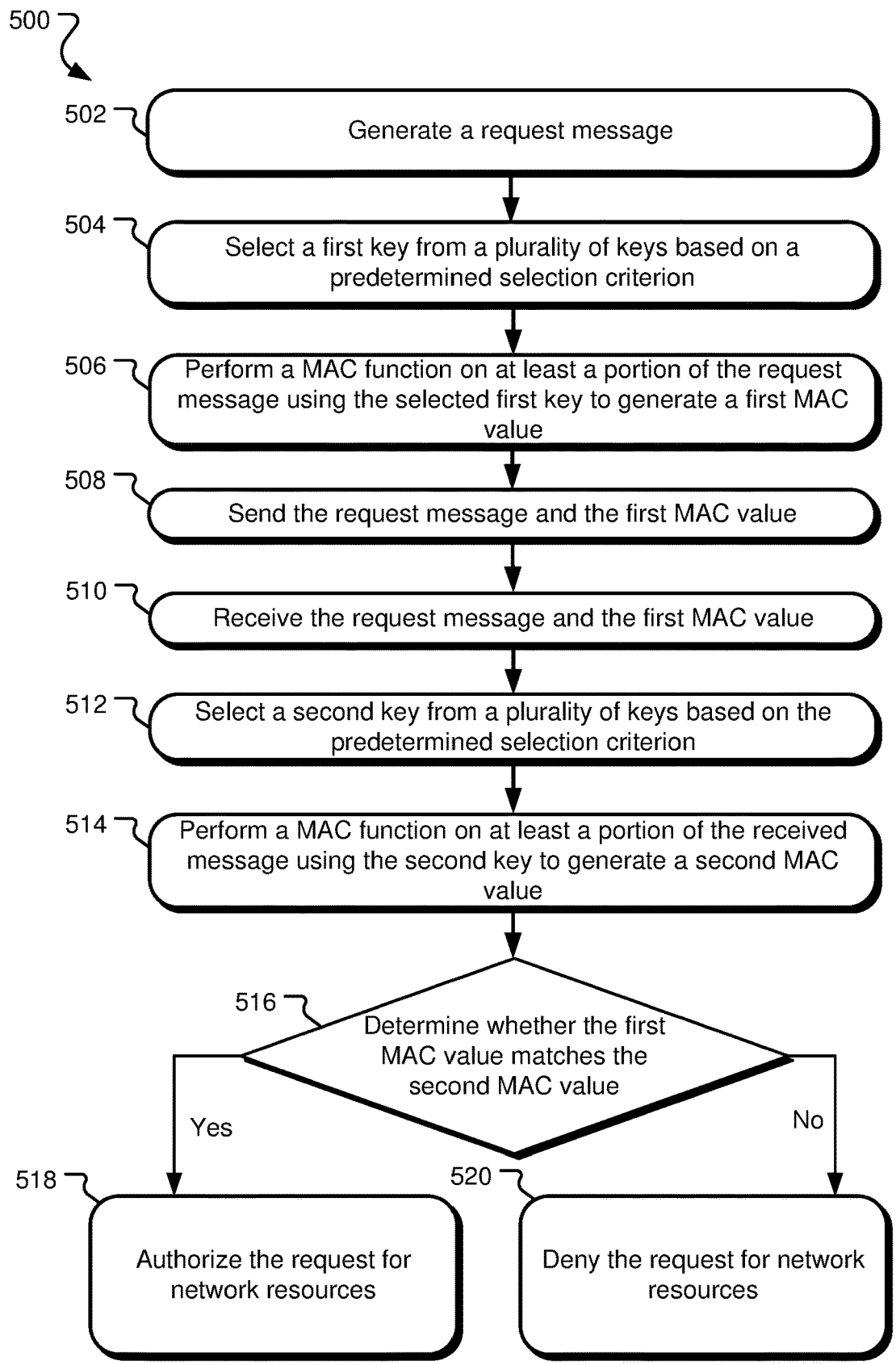
FIG. 5 illustrates alternative example operations for security key hopping.

FIG. 5 illustrates alternative example operations 500 for security key hopping. Processor readable instructions for the operations 500 may be stored in a memory and performed by a processor. The operations 500 may also be performed on different devices such as a user device and a network resource device. In response to a user action on a user device, a generate operation 502 generates a request message. A selecting operation 504 selects a first key from a plurality of keys based on a predetermined selection criterion. The plurality of keys may be shared between the user device and the network resource. A performing operation 506 performs a message authentication code (MAC) function on a least a portion of the request message using the selected first key to generate a first MAC value. The MAC function may be referred to as a cryptographic operation. A sending operation 508 sends the request message and the first MAC value. Operations 502 to 508 may take place on the user device A receiving operation 510 receives the request message and the first MAC value at the network resource system. A selecting operation 512 selects a second key from a plurality of keys based on the predetermined selection criterion. A performing operation 514 performs a MAC function on at least a portion of the received message using the second key to generate a second MAC value. A determining operation 516 determines whether the first MAC value matches the second MAC value. If the first MAC value matches the second MAC value, then the request is authenticated and an authorizing operation 518 authorizes the request for network resources. If the two MAC values do not match, then a denying operation 520 denies the request for network resources.

Figure 6:
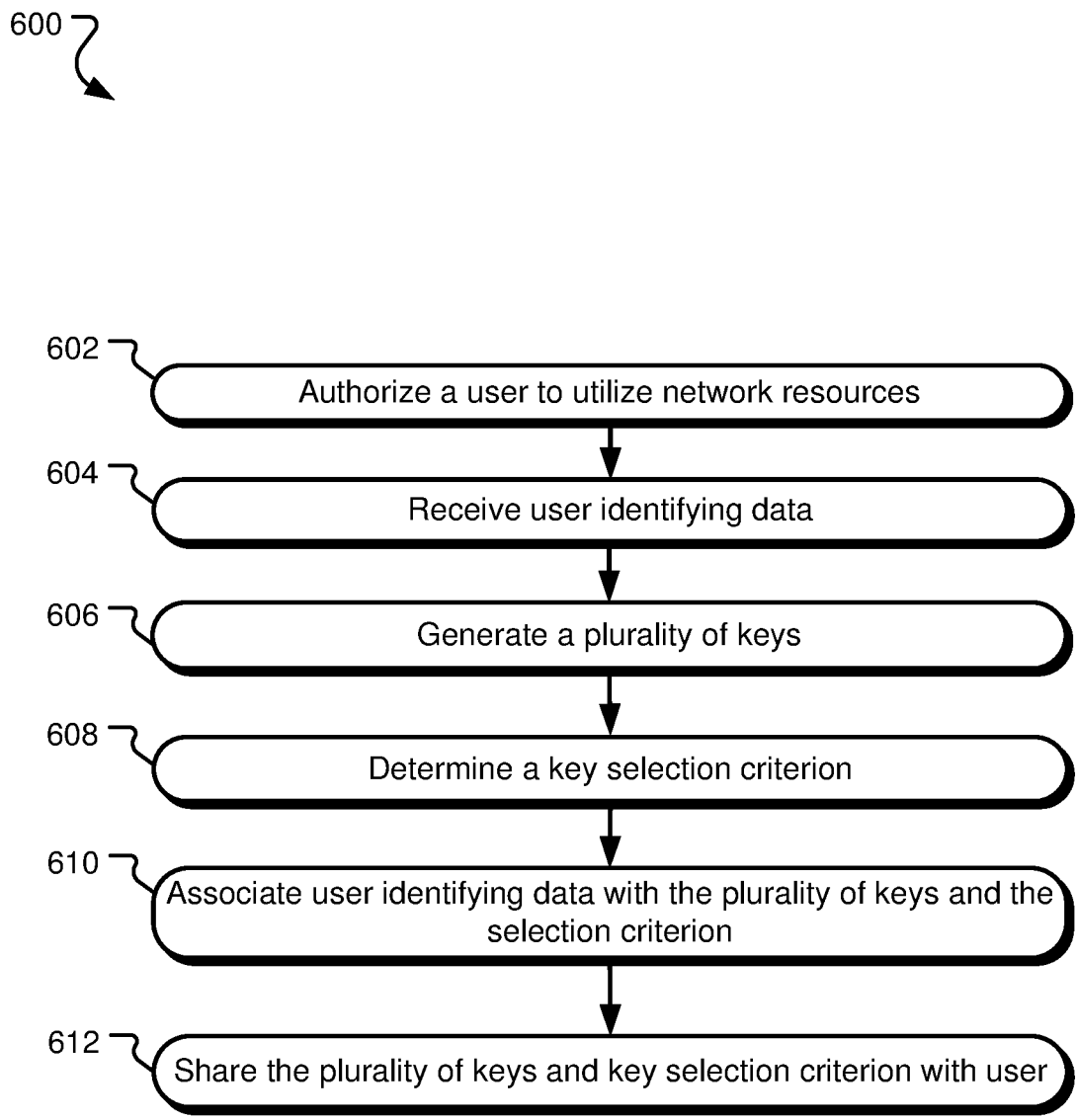
FIG. 6 illustrates example operations for initialization of the security key hopping system.

FIG. 6 illustrates example operations 600 for initialization of the security key hopping system. The operations 600 may be embodied in processor readable instructions stored in a memory and executed by a processor. An authorizing operation 602 authorizes a user to utilize network resources. Such authorization may happen in response to a user downloading an application (e.g., a secure connection application) on a device such as a smart phone or laptop, signing up for a service, by a system administrator authorizing a user, etc. A receiving operation receives user identifying data. Such user identifying may include an application identifier, licenses key, user identifier, device identifier, etc. A generating operation 606 generates a plurality of keys. The keys may be generated based on the received user identifying data. The keys may also or alternatively be generated according to a selected encryption algorithm, or the keys may be generated by a random number generator. A determining operation 608 determines a key selection criterion. The key selection criterion may enable variation of selected keys based upon the chosen criterion parameter (e.g., communication timestamp, size of data, etc.). The key selection criterion may be selected by a system administrator, by the user, by the system design, etc. Any number of criteria may be used, such as the criteria described above with respect to FIG. 1.

An associating operation 610 associates the user identifying data with the plurality of keys and the selection criterion. The associating operation 610 may be used when the network resources services a number of users. As such, when the user requests resources or sends encrypted data, the network resource system may retrieve the plurality of keys and/or selection criterion to authenticate the user or decrypt data. A sharing operation 612 shares the plurality of keys and the key selection criterion with the user (e.g., a user device). The user device may store the plurality of keys and the selection criterion in association with the downloaded application such that the device may retrieve the keys and criterion upon a request or encryption command. The operations 600 may be handled by a third party authenticator to add another layer of security. Furthermore, some or all of the operations 600 may occur in a re-authorization process. For example, if one or both parties to a system determine that the keys and/or the selection criterion have been compromised. The user/user device may be reauthorized using the operations 600. This authentication also or alternatively may occur after a predetermined period of time or number of communications or communication sessions.

Figure 7:
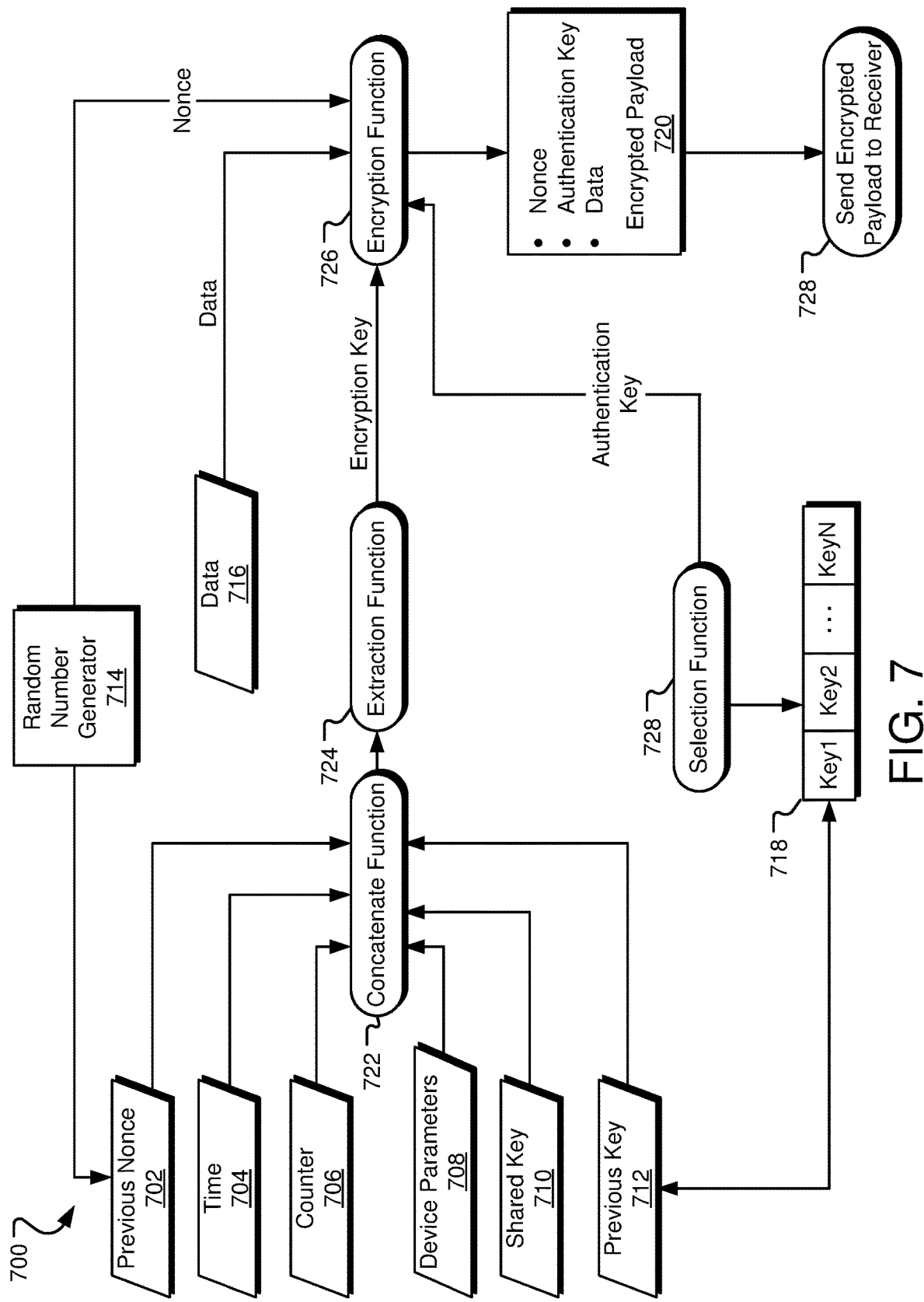
FIG. 7 illustrates an example dataflow diagram for a security key hopping system.

FIG. 7 illustrates an example dataflow diagram 700 for a security key hopping system. Specifically, FIG. 7 illustrates the dataflow diagram 700 for the system that uses both authentication keys and encryption keys and/or an index to select from a set of agreed to keys. A number of inputs, such as a previous nonce 702, a current time 704, a count from a counter 706, device parameters 708, a shared key 710 and a previous key 712 are input into a concatenate function 722 that combines the input data. The previous nonce 702 is a cryptographic nonce that may be used once and generated by a random number generator 714. The device parameters 708 may be a secret key, device id, component ID, or other type of electronic fingerprint that is known by both sides (e.g., a data resource system and a user system). It should be understood that the input data is for illustrative purposes and that in certain implementations, not all of the illustrated input data is used. Furthermore, use of other input data is contemplated. The concatenate function outputs data to an extraction function 724, which extracts an encryption key from the concatenated data. For example, the extraction function 724 may be a cryptographic hash (e.g., SHA-256). A selection function 728 selects an authentication key from a key set 718. The selection function 728 may be a math function such as modulo that uses the previous key 712 to determine the next key. As a key is selected from the key set 718, the selected key is stored in the previous key 712.

The authentication key selected by the selection function 728, and data 716 (e.g., message, file, sector), and the nonce generated by the random number generator 714 is input to an encryption function 726 which encrypts such information using the encryption key generated by the extraction function 724 to produce an encrypted payload 720. The encrypted payload 720 is sent to a receiver (e.g., a resource system or a user) in a sending operation 728. The receiver is able to use the same selection criterion to generate the authentication key and the encryption key. The receiver decrypts the payload 720 using the encryption key, compares the authentication keys for authentication. Furthermore, the sender and the receiver increment the counter (e.g., the counter 706). The receiver then stores or uses the data, stores the nonce in the previous nonce storage location, and stores the encryption key in the previous key storage location. Thus, during a next operation, the receiver is able to use the previous key and nonce to perform encryption and authorization. In other words, after a transaction, both ends of the transmission have the same set of selection criteria including the nonce and the previous key. This means that either end of the transmission can readily initiate the next transmission and will have the necessary inputs. This provides an additional security layer as input data used to initiate the previous key are stored for use in the next transmission, providing a feedback selection criterion.

In alternative implementations, the encryption key is selected from the key set 718 using the selection function 728 (instead of selecting the encryption key from the key set 718). Thus, the data could be encrypted using a selected key. Further in this example implementations, the authentication key could be generated using the concatenate function 722 (with the input data 702-712, or a portion thereof) and the extraction function 724 (instead of the encryption key).

To initialize the system described in FIG. 7, two communication points (e.g., sender and receiver) may be provisioned with a shared key. The shared key could be established in hardware as part of the manufacture of the endpoints or provisioned in on-volatile memory as part of the manufacture or could be provision when the equipment or program is put into service. Using the shared key, the initialize occurs by securing a message containing all of the initial values of the selection criterion (e.g., the nonce 702, the time 704, the counter 706, the device parameters, and a selection criterion) along with the set of keys 718. The message may be a hash concatenation of all initialization parameters and is secured (e.g., using the shared key) and sent to the other party (e.g., the receiver). The hash function may be SHA-256, MD-5, etc. The message may be secured using any of, without limitation, symmetric encryption, public key encryption (e.g., RSA or elliptic curve), or a variety of message authentication codes such as MAC, HMAC, etc. The receiver then uses the shared key to validate and read the message and receives and stores the initialization values in non-volatile memory. In some implementations, the receiver can return initialization parameters to the sender using the same method. This allows each communication point to establish independent trust relationships with each communication point. In alternative implementations, the receive could transfer the initialization parameters while additionally using the selection criterion supplied by the sender to resolve a new key.

In addition to methods, the embodiments of the technology described herein can be implemented as logical steps in one or more computer systems. The logical operations of the present technology can be implemented (1) as a sequence of processor-implemented steps executing in one or more computer systems and/or (2) as interconnected machine or circuit modules within one or more computer systems. Implementation is a matter of choice, dependent on the performance requirements of the computer system implementing the technology. Accordingly, the logical operations of the technology described herein are referred to variously as operations, steps, objects, or modules. Furthermore, it should be understood that logical operations may be performed in any order, unless explicitly claimed otherwise or unless a specific order is inherently necessitated by the claim language.

Data storage and/or memory may be embodied by various types of storage, such as hard disc media, a storage array containing multiple storage devices, optical media, solid-state drive technology, ROM, RAM, and other technology. The operations may be implemented in firmware, software, hard-wired circuitry, gate array technology and other technologies, whether executed or assisted by a microprocessor, a microprocessor core, a microcontroller, special purpose circuitry, or other processing technologies. It should be understood that a write controller, a storage controller, data write circuitry, data read and recovery circuitry, a sorting module, and other functional modules of a data storage system may include or work in concert with a processor for processing processor-readable instructions for performing a system-implemented process.

For purposes of this description and meaning of the claims, the term "memory" means a tangible data storage device, including non-volatile memories (such as flash memory and the like) and volatile memories (such as dynamic random access memory and the like). The computer instructions either permanently or temporarily reside in the memory, along with other information such as data, virtual mappings, operating systems, applications, and the like that are accessed by a computer processor to perform the desired functionality. The term "memory" expressly does not include a transitory medium such as a carrier signal, but the computer instructions can be transferred to the memory wirelessly.

The above specification, examples, and data provide a complete description of the structure and use of example embodiments of the disclosed technology. Since many embodiments of the disclosed technology can be made without departing from the spirit and scope of the disclosed technology, the disclosed technology resides in the claims hereinafter appended. Furthermore, structural features of the different embodiments may be combined in yet another embodiment without departing from the recited claims.

What is claimed is:

1. A method comprising:
   receiving a plurality of successive communications from a user device at a network resource during a communication session, each successive communication being encrypted at the user device with a different first key selected from a set of keys based on a predetermined criterion that is known to the user device and the network resource prior to receiving the plurality of successive communications, wherein the plurality of successive communications are requests for network resources;
   selecting, for each different first key, a corresponding different second key from the set of keys based on the predetermined criterion, the set of keys and the predetermined criterion being known to the user device and the network resource;
   performing a cryptographic operation on each successive communication using the respective different second key; and
   upon a determination that the plurality of successive communications are authenticated, authorizing the request for the network resources.

2. The method of claim 1, wherein the cryptographic operation further comprises:
   performing a message authentication code (MAC) function on at least a portion of the plurality of successive communications to determine whether the plurality of successive communications are authenticated.

3. The method of claim 1 wherein the plurality of successive communications comprise encrypted data and wherein performing the cryptographic operation further comprises:
   decrypting the encrypted data with the second key.

4. The method of claim 1 wherein the predetermined criterion is based on a timestamp of said each successive communication.

5. The method of claim 1, wherein the predetermined criterion is associated with an identifier of the user.

6. The method of claim 1, wherein the predetermined criterion is based on a modulo operation.

7. The method of claim 1, wherein the predetermined criterion and the one or more keys are generated by a third party authenticator.

8. The method of claim 1 wherein the predetermined criterion is based on a session number of said each successive communication received.

9. A network resource comprising:
   a non-transitory storage media storing instructions; and
   a secure connection application stored in the non-transitory storage media and including the instructions, when executed by a processor cause the processor to:
   receive a communication from a user at a network resource, the communication being encrypted with a first key selected from one or more keys based on a predetermined criterion that is based on an amount of data in the communication, the predetermined criterion being known to the user device and the network resource prior to receiving the communication, and wherein the communication is a request for data of the network resource;
   select a second key from the one or more keys based on the predetermined criterion, the keys and the predetermined criterion being known to the user and the network resource prior to selecting the second key;
   perform an operation on the communication using the second key; and
   upon a determination that the communication is authenticated, authorize the request for data of the network resource.

10. The network resource of claim 9, wherein the communication is a request for data of the network resource, the secure connection application further configured to:
    perform a message authentication code (MAC) function on at least a portion of the communication to determine whether the communication is authenticated, and upon a determination that the communication is authenticated, authorize the request for data of the network resource.

11. The network resource of claim 9 wherein the communication comprises encrypted data, the data being encrypted utilizing the second key, wherein the secure connection application is configured to perform the operation comprising a cryptographic operation on the communication using the second key by:
    decrypting the encrypted data with the selected key.

12. The network resource of claim 9, wherein the predetermined criterion is based on a timestamp of the communication, the secure connection application further configured to account for time differences between the user and the network resource.

13. Non-transitory computer-readable medium encoding computer-executable instructions for executing on a computer system a computer process to improve the computer system, the medium, when executed, including:

receiving a communication from a user at a network resource, the communication including a quantity of data, each of a plurality of successive portions of the quantity of data being encrypted with a different first key selected from a set of keys based on a predetermined criterion that is known to the user device and the network resource prior to receiving the communication, wherein the plurality of successive communications are requests for network resources;

selecting, for each different first key, a second key from the set of keys based on the predetermined criterion, the set of keys and the predetermined criterion being known to the network resource prior to selecting the second key;

performing a cryptographic operation on each successive portion of data using the second key; and upon a determination that the plurality of successive communications are authenticated, authorizing the request for the network resources.

14. The non-transitory computer-readable medium of claim 13, wherein the cryptographic operation further comprises:

performing a message authentication code (MAC) function on at least a portion of the communication to determine whether the communication is authenticated.

15. The non-transitory computer-readable medium of claim 13, wherein the predetermined criterion is based on a size of the portion of the quantity of data.

16. The non-transitory computer-readable medium of claim 13 wherein the predetermined criterion is based on at least one of a timestamp of the communication or an identifier of the user.

17. The non-transitory computer-readable medium of claim 13, wherein the predetermined criterion is based on a modulo operation.

18. The non-transitory computer-readable medium of claim 13, wherein the predetermined criterion and the one or more keys are generated by a third party authenticator.

19. The non-transitory computer-readable medium of claim 13, wherein the predetermined criterion is based on a session number of the communication received.

20. The non-transitory computer-readable of claim 13, wherein each second key corresponds to a different respective first key and each second key is different than other second keys associated with different respective first keys.

* * * * *